US012566146B2

(12) United States Patent
Himeda et al.

(10) Patent No.: US 12,566,146 B2
(45) Date of Patent: Mar. 3, 2026

(54) INFORMATION PROCESSING APPARATUS, INFORMATION PROCESSING METHOD, NON-TRANSITORY COMPUTER READABLE MEDIA STORING PROGRAM, AND X-RAY ANALYSIS APPARATUS

(71) Applicant: RIGAKU CORPORATION, Tokyo (JP)

(72) Inventors: Akihiro Himeda, Tokyo (JP); Takumi Ohta, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 675 days.

(21) Appl. No.: 17/987,874

(22) Filed: Nov. 16, 2022

(65) Prior Publication Data

US 2023/0184699 A1      Jun. 15, 2023

(30) Foreign Application Priority Data

Dec. 15, 2021      (JP) ................................. 2021-203145

(51) Int. Cl.
*G01N 23/20*      (2018.01)
*G01N 23/083*      (2018.01)
*G06N 3/02*      (2006.01)

(52) U.S. Cl.
CPC ........... *G01N 23/20* (2013.01); *G01N 23/083* (2013.01); *G06N 3/02* (2013.01)

(58) Field of Classification Search
CPC ......... G01N 23/20; G01N 23/083; G06N 3/02
See application file for complete search history.

(56) References Cited

FOREIGN PATENT DOCUMENTS

JP      2005-121613 A      5/2005
JP      2010-249784 A      11/2010

OTHER PUBLICATIONS

Japanese Office Action issued Nov. 5, 2024 in corresponding Japanese Patent Application No. 2021-203145, 4 pages.

*Primary Examiner* — Ann J Lo
(74) *Attorney, Agent, or Firm* — XSENSUS LLP

(57)      ABSTRACT

According to an aspect of the present invention, provided is an information processing apparatus, comprising: a processor configured to execute a program so as to output a diagnostic result diagnosing an analysis profile result by inputting an input profile result in relation to an intensity of X-ray from a thin film and the analysis result of the input profile result to a neural network, wherein the neural network is a neural network that is allowed to machine-learn teacher data using input profile data in relation to an intensity of X-ray from a thin film and analysis profile data obtained from the input profile data as input data, and using diagnostic data obtained by diagnosing the analysis profile data as output data.

8 Claims, 13 Drawing Sheets

INFORMATION PROCESSING APPARATUS, INFORMATION PROCESSING METHOD, NON-TRANSITORY COMPUTER READABLE MEDIA STORING PROGRAM, AND X-RAY ANALYSIS APPARATUS

CROSS REFERENCE TO RELATED APPLICATIONS

The present application claims priority under 35 U.S.C. § 119 to Japanese Patent Application No. 2021-203145, filed Dec. 15, 2021.

BACKGROUND

Technical Field

The present invention relates to an information processing apparatus, an information processing method, a non-transitory computer readable media storing a program, and an X-ray analysis apparatus, which use machine learning to diagnose validity of a parameter in relation to a thin film when analyzing the thin film by reflectance measurement, rocking curve measurement, GI-SAXS (Grazing incidence small-angle X-ray scattering) measurement, or the like.

Related Art

In the analysis of a thin film using an X-ray analysis apparatus, a profile result representing X-ray intensity from the thin film is obtained and fitted to a profile generated from a structural model of the thin film to determine parameter in relation to the thin film. For instance, in reflectance measurement, the X-ray intensity is a reflected intensity from the thin film, and the parameter is film thickness, density, roughness, or the like of the thin film. In rocking curve measurement, the X-ray intensity is a diffraction intensity from the thin film, and the parameter is lattice constant, film thickness, composition, or the like of the thin film. In GI-SAXS, the X-ray intensity is a scattering intensity from the thin film, and the parameter is size distribution of the thin film, such as pore size or particle size. In these analyses, the parameter of the structural model of the thin film is optimized using an evaluation value as a guide to determine validity of the analysis result.

Japanese Patent Application Publication No. 2010-249784 discloses a technique for analyzing thickness and composition of a thin film by X-ray diffraction using simple operations, even without being a person skilled in X-ray analysis. R value is used as an evaluation value for the analysis, and parameter of the thin film is optimized to reduce the R value.

However, it is difficult to determine whether data obtained by such a method is accurate or not using only the R value, and it is still necessary to be confirmed by a person skilled in X-ray analysis. Therefore, there is a need for a technique that allows a person who is not a person skilled in X-ray analysis to confirm whether the obtained data is accurate or not.

One purpose of the present invention is to solve such a problem, and is to provide an X-ray analysis apparatus or the like for diagnosing validity of parameter in relation to a thin film from data obtained by analyzing thin film structure of a measurement result such as reflectance measurement, rocking curve measurement, GI-SAXS measurement, or the like.

According to an aspect of the present invention, provided is an information processing apparatus, comprising: a processor configured to execute a program so as to output a diagnostic result diagnosing an analysis profile result by inputting an input profile result in relation to an intensity of X-ray from a thin film and the analysis result of the input profile result to a neural network, wherein the neural network is a neural network that is allowed to machine-learn teacher data using input profile data in relation to an intensity of X-ray from a thin film and analysis profile data obtained from the input profile data as input data, and using diagnostic data obtained by diagnosing the analysis profile data as output data.

BRIEF DESCRIPTION OF THE DRAWINGS

FIG. 4 shows an example of a mind map.
FIG. 8 shows an example of a functional configuration of a client computer.

DETAILED DESCRIPTION

Hereinafter, embodiments of the present invention will be described with reference to the drawings. Various features described in the embodiment below can be combined with each other.

Definition

A program for realizing a software in the present embodiment may be provided as a non-transitory computer readable medium that can be read by a computer or may be provided for download from an external server or may be provided so that the program can be activated on an external computer to realize functions thereof on a client terminal (so-called cloud computing).

In the present embodiment, the "unit" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be performed on a circuit in a broad sense.

Further, the circuit in a broad sense is a circuit realized by combining at least an appropriate number of a circuit, a circuitry, a processor, a memory, and the like. In other words, it is a circuit which includes application specific integrated circuit (ASIC), programmable logic device (e.g., simple programmable logic device (SPLD), complex programmable logic device (CPLD), and field programmable gate array (FPGA)), and the like.

The parameter is information including one or more of the following: film thickness, density, roughness, composition, lattice constant, or size distribution of a thin film. More specifically, the parameter in a reflectance measurement includes film thickness, density, and roughness of a thin film. Further, the parameter in a rocking curve measurement includes film thickness and composition of a thin film. Furthermore, the parameter in a GI-SAXS measurement includes size distribution of a thin film, such as porosity and grain size. The term parameter is used herein as a concept that includes both parameter result and parameter data.

Figure 1:
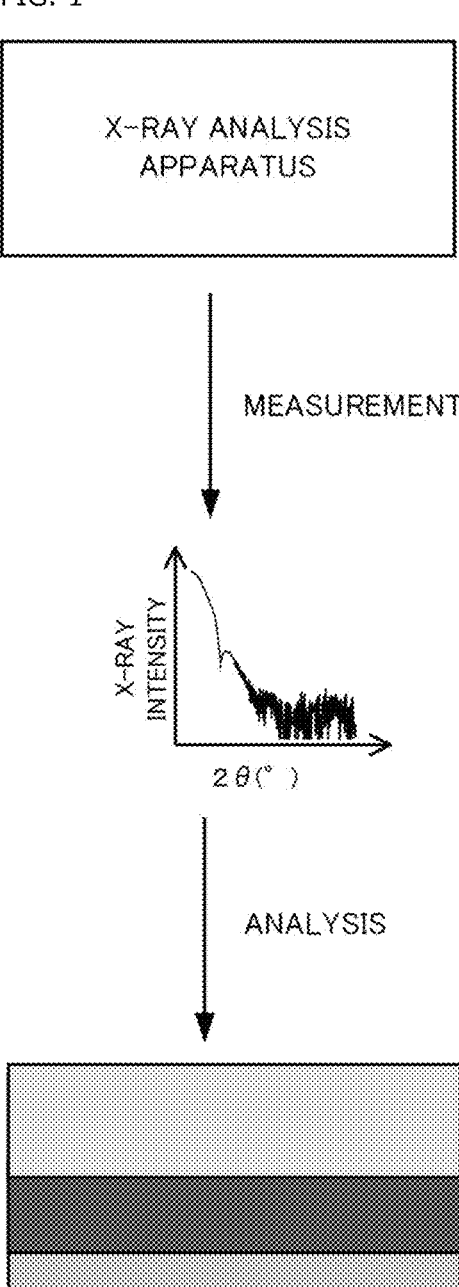
FIG. 1 illustrates a measurement profile.

FIG. 1 illustrates a measurement profile. The measurement profile is data representing X-ray intensity of a thin film measured by an X-ray analysis apparatus. By analyzing the measurement profile, it is possible to obtain parameter of the thin film.

Figure 2:
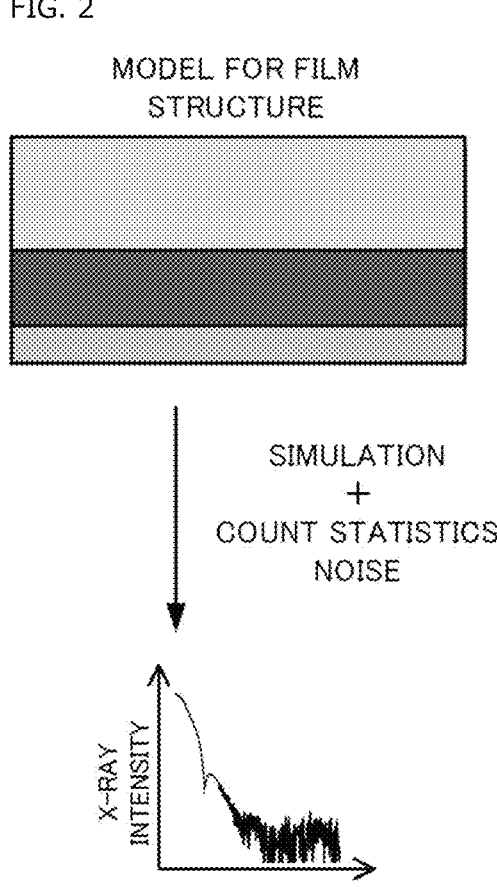
FIG. 2 illustrates a measurement simulation profile.

FIG. 2 illustrates a measurement simulation profile. The measurement simulation profile is generated by simulating X-ray intensity for a film model that is set based on the parameter forming the thin film, and adding noise according to statistics or probability theory, such as Poisson distribution.

Figure 3:
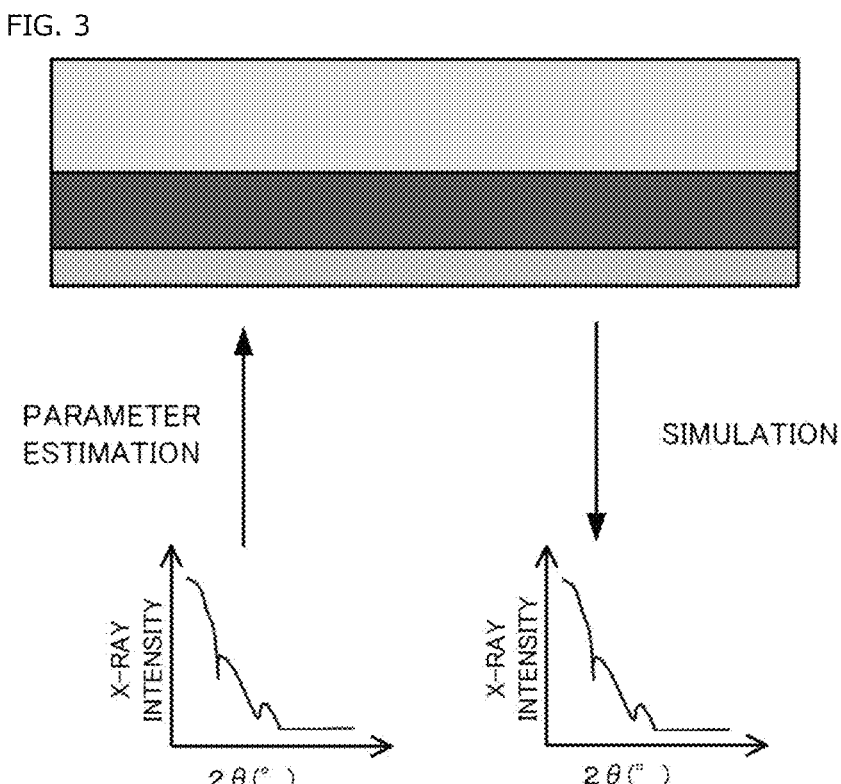
FIG. 3 illustrates an analysis profile.

FIG. 3 illustrates an analysis profile. The analysis profile is obtained by simulating a profile for the parameter of the thin film obtained by analysis. As an example of a more specific process of obtaining an analysis profile, parameter of the thin film of several patterns are estimated by applying a predetermined calculation formula for an input profile such as a measurement profile. Next, for one parameter, an analysis profile can be obtained by simulating the profile. At this time, validity of the selected parameter is verified from degree of agreement or the like between the analysis profile and the input profile. In the present specification, the analysis profile with the highest validity is referred to as a correct solution analysis profile, and other analysis profile is referred to as false solution analysis profile.

In the present specification, the term profile is used herein as a concept that includes any of the measurement profile, the measurement simulation profile, and the analysis profile. Further, the term input profile is used herein as a concept that includes the measurement profile and the measurement simulation profile. Moreover, in the present specification, the term profile is also used herein as a concept that includes both profile result and profile data.

Figure 4:
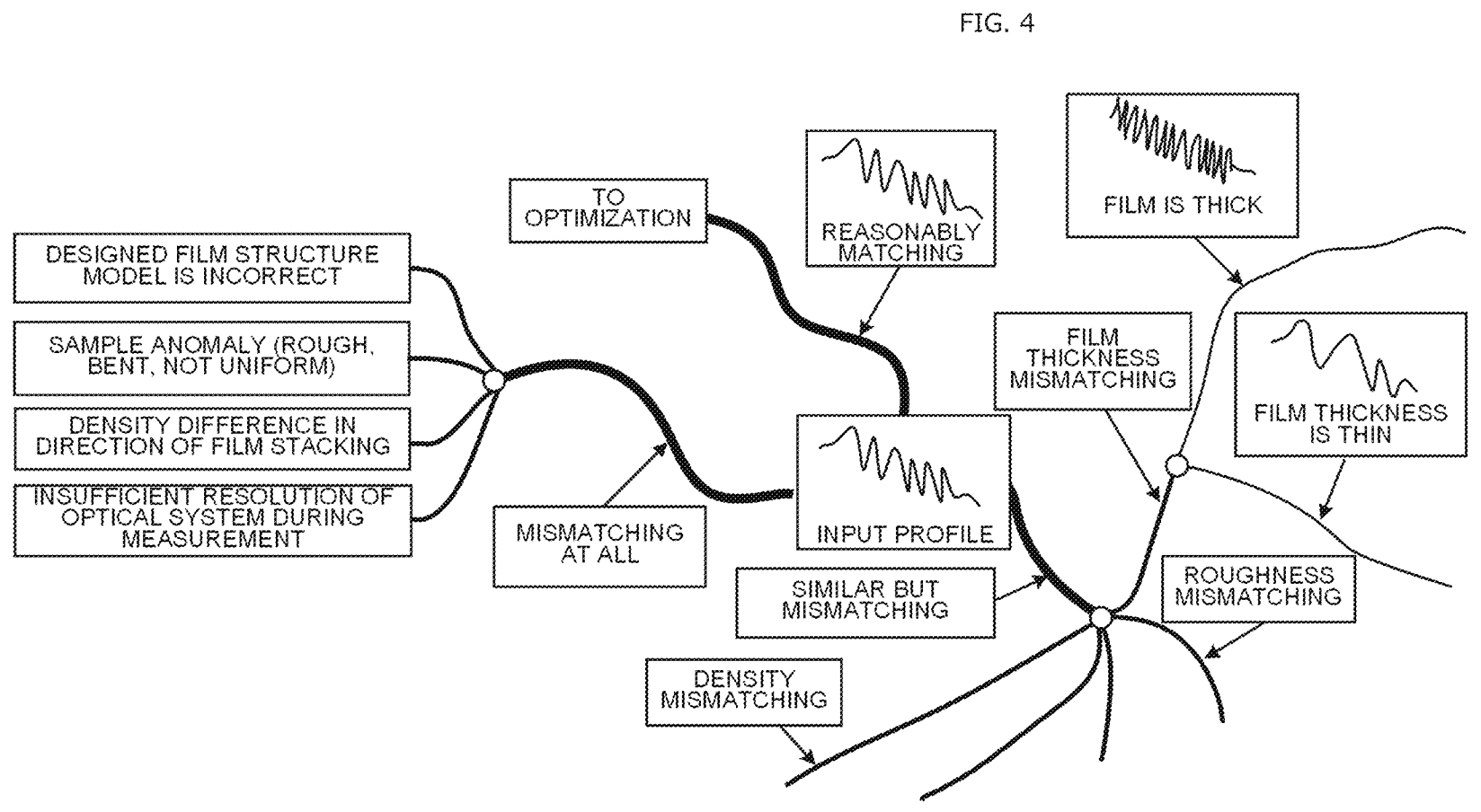

FIG. 4 shows an example of a mind map of a person skilled in X-ray analysis.

The mind map embodies thoughts of an X-ray analysis of the skilled person.

In FIG. 4, there is an input profile in a center and branches by each matching degree of the analysis profile to the input profile. Specifically, the input profile is branched into cases where the analysis profiles are reasonably matching, similar but mismatching, or mismatching at all.

In the case of reasonable matching, a fact that the input profile and the analysis profile are reasonably matching is indicated. In this case, the analysis profile is the correct solution profile.

In the case of similar but mismatching, a fact that there is a mismatch between the input profile and the analysis profile in terms of film thickness, density, roughness, substance, etc., which is further branched out for each cause, is indicated. In the case of mismatching at all, a fact that a designed structure is incorrect, a sample is abnormal, a film is too thick, or some other problem may have occurred during the measurement is indicated. Analysis profiles that is similar but mismatching or mismatching at all is the false solution profile. The term substance refers to a constituent element and a structure of the constituent element. Furthermore, although the above description is based on an example of a mind map of the reflectance measurement, the same applies to the rocking curve measurement and the GI-SAXS measurement.

First Embodiment

In a first embodiment, a case of performing learning of a neural network on a server side and verifying correctness of the analysis profile result using the learned neural network on a client side will be described. More specifically, a case will be described in which on the server side where the service is provided, a person skilled in X-ray analysis creates teacher data, sets the neural network, and allows the neural network to learn based on his/her expertise, etc. On the client side where the service is received, data of the learned neural network set on the server side is used for verification equivalent to the skilled person.

1. System Configuration

Figure 5:
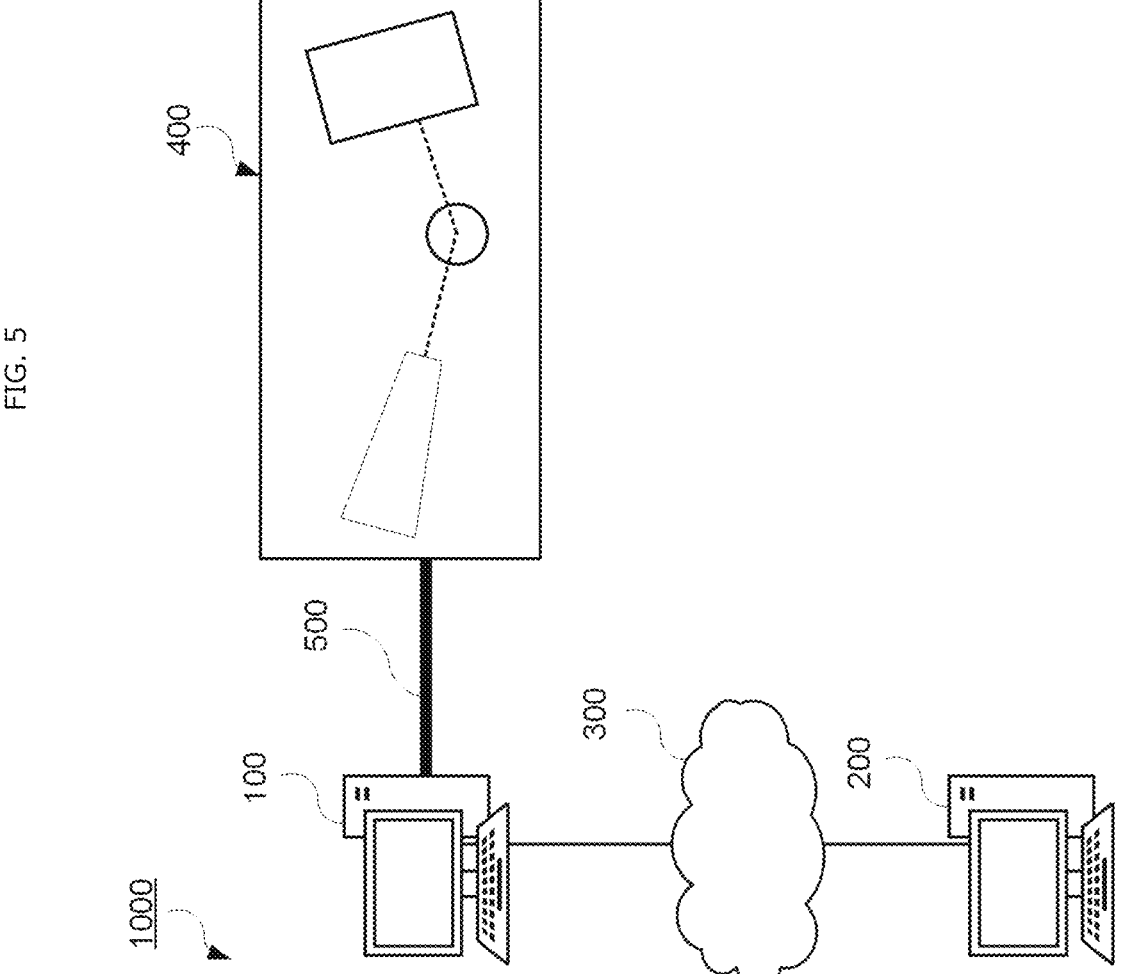
FIG. 5 shows an example of a system configuration of an information processing system.

FIG. 5 shows an example of a system configuration of an information processing system 1000 according to the first embodiment. As shown in FIG. 5, the information processing system 1000 comprises a client computer 100, a server computer 200, a network 300, an X-ray analysis apparatus 400, and a contact unit 500. The client computer 100 is configured to communicate with the server computer 200 via the network 300. Further, the client computer 100 is configured to communicate with the X-ray analysis apparatus 400 via the contact unit 500. Thereby, the client computer 100 transmits or receives information to or from the server computer 200 and the X-ray analysis apparatus 400. The client computer 100 and the server computer 200 are examples of the information processing apparatus, and not limited to the present embodiment as long as they are apparatus capable of performing film structure analysis. That is, the client computer 100 and the server computer 200 may be PC (Personal Computer), tablet computer, smart phone, or the like. Moreover, the contact unit 500 may be configured with either wired or wireless connection.

Hardware Configuration

Next, a hardware configuration of the client computer 100, server computer 200, and the X-ray analysis apparatus 400 will be described.

2.1. Hardware Configuration of Client Computer 100

Figure 6:
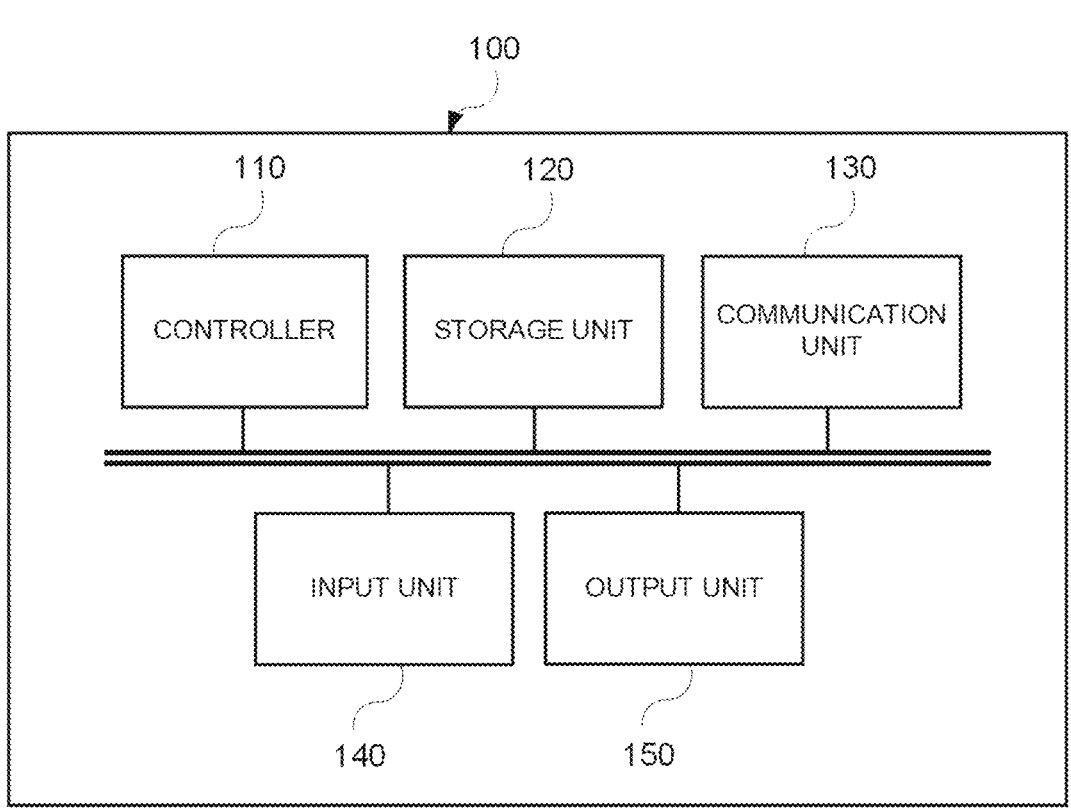
FIG. 6 shows an example of a hardware configuration of a client computer.

FIG. 6 shows an example of the hardware configuration of the client computer 100.

As shown in FIG. 6, the client computer 100 comprises a controller 110, a storage unit 120, a communication unit 130, an input unit 140, and an output unit 150. These components are electrically connected via a communication bus inside the client computer 100. The client computer 100 executes processing in relation to the present embodiment.

The controller 110 performs process and control of overall operation associated with the client computer 100. The controller 110 is, for example, a central processing unit (CPU). The controller 110 reads a predetermined program stored in the storage unit 120 and executes processing based on the program. Various functions of the client computer 100, for example, processes shown in FIGS. 8 and 9 below, are realized by the controller 110. The controller 110 is not limited to a single one, but may be implemented with a plurality of controllers 110 for each function. A combination thereof may be applied as well.

The storage unit 120 stores various information as defined by the above description. It may be implemented as, for example, a storage device such as a solid state drive (SSD) that stores various programs in relation to the client computer 100 executed by the controller 110, or as a temporary memory such as a random access memory (RAM) that stores temporarily necessary information (arguments, arrays, etc.) in relation to program operation. The storage unit 120 stores various programs in relation to the client computer 100 executed by the controller 110, variables, data used when the controller 110 executes processing based on the programs, or the like. The storage unit 120 is an example of a storage medium.

The communication unit 130 preferably uses wired communication means such as USB, IEEE 1394, Thunderbolt, and wired LAN network communication, etc., but wireless LAN network communication, mobile communication such as LTE/3G/4G/5G, and Bluetooth (registered trademark) communication, etc. may also be included as necessary. In other words, it is more preferable to implement as a set of these communication means. That is, the client computer 100 may communicate various information from outside via the communication unit 130.

The input unit 140 may be included in a housing of the client computer 100 or may be externally attached. For example, the input unit 140 may be implemented as a touch panel integrated with the output unit 150. With a touch panel, a user may input a tap operation, a swipe operation, or the like. Of course, a switch button, a mouse, a QWERTY keyboard, or the like may be employed instead of the touch panel. In other words, the input unit 140 receives input based on an operation performed by the user. The input is transferred as an instruction signal to the controller 110 via a communication bus, and the controller 110 may perform a predetermined control or calculation as necessary.

The output unit 150 may function as a display unit of the client computer 100. The output unit 150 may be included in the housing of the client computer 100, for example, or may be externally attached. The output unit 150 displays a screen of a graphical user interface (GUI) that can be operated by the user. GUI) screen that can be operated by the user. For example, it is preferable to use different type of display device, such as a CRT display, a liquid crystal display, an organic EL display, or a plasma display, according to the type of the client computer 100.

2.2. Hardware Configuration of Server Computer 200

Figure 7:
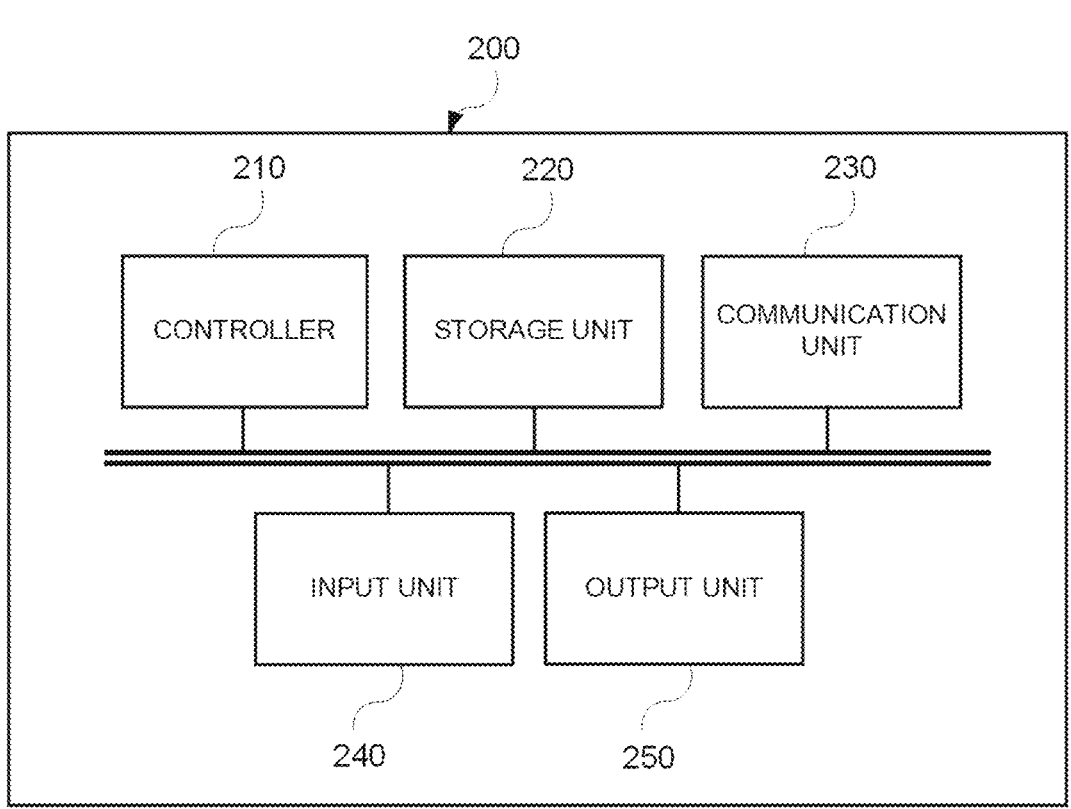
FIG. 7 shows an example of a hardware configuration of a server computer.

FIG. 7 shows an example of a hardware configuration of the server computer 200.

As shown in FIG. 7, the server computer 200 comprises a controller 210, a storage unit 220, a communication unit 230, an input unit 240, and an output unit 250, and these components are electrically connected via a communication bus inside the server computer 200. For details of each hardware configuration of the server computer 200, please refer to the client computer 100.

2.3. Hardware Configuration of X-Ray Analysis Apparatus 400

The X-ray analysis apparatus 400 comprises an X-ray source, a sample, and a detector. X-ray is irradiated from the X-ray source, and the detector detects the X-ray from the sample to obtain a measurement profile. The X-ray analysis apparatus 400 and the client computer 100 are configured to communicate with each other via the contact unit 500 to send and receive information such as instruction to start measurement and the measurement profile.

3. Functional Configuration

Hereinafter, functional configuration of the client computer 100 and the server computer 200 will be described.

3.1. Functional Configuration of Client Computer 100

Figure 8:
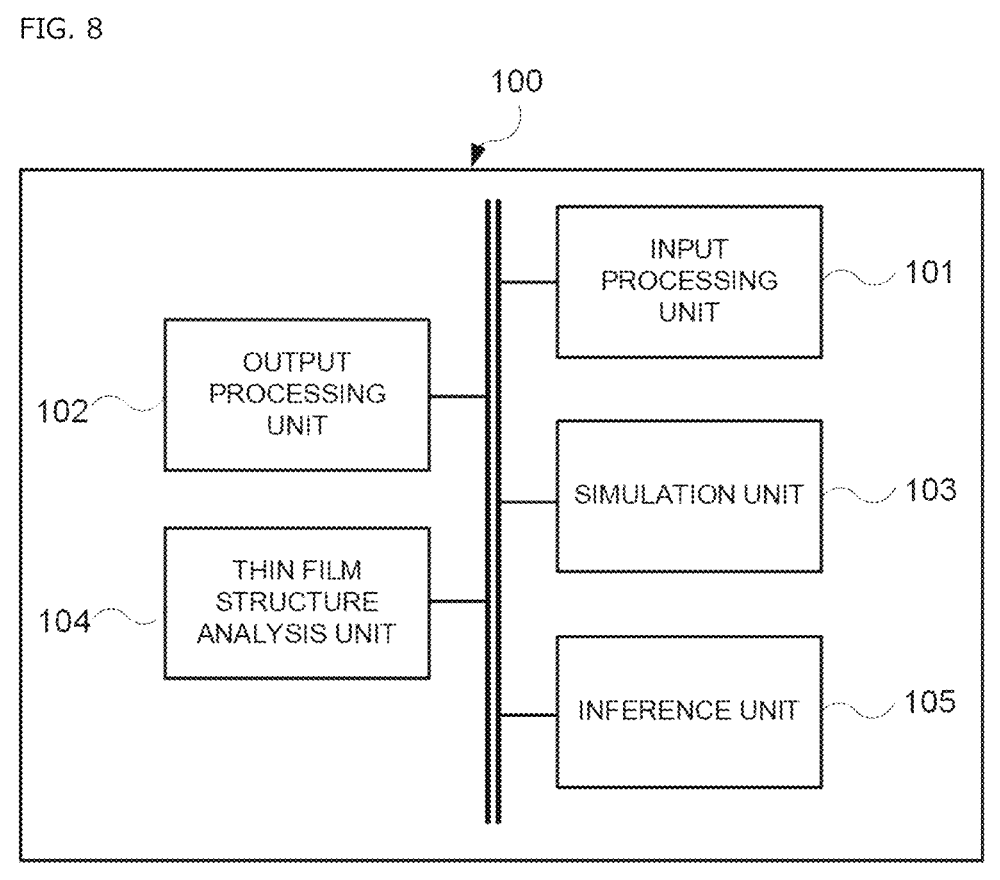

FIG. 8 shows an example of the functional configuration of the client computer 100.

As shown in FIG. 8, the client computer 100 comprises an input processing unit 101, an output processing unit 102, a simulation unit 103, a thin film structure analysis unit 104, and an inference unit 105.

The input processing unit 101 controls processing in relation to input of signal to the client computer 100.

The output processing unit 102 controls processing in relation to output of signal from the client computer 100.

Based on substance and parameter of the thin film, the simulation unit 103 executes simulation and obtains a profile.

The thin film structure analysis unit 104 obtains parameter from the profile.

The inference unit 105 inputs an analysis profile result to a learned neural network to infer a diagnostic result of the analysis profile result.

3.2. Functional Configuration of Server Computer 200

Figure 9:
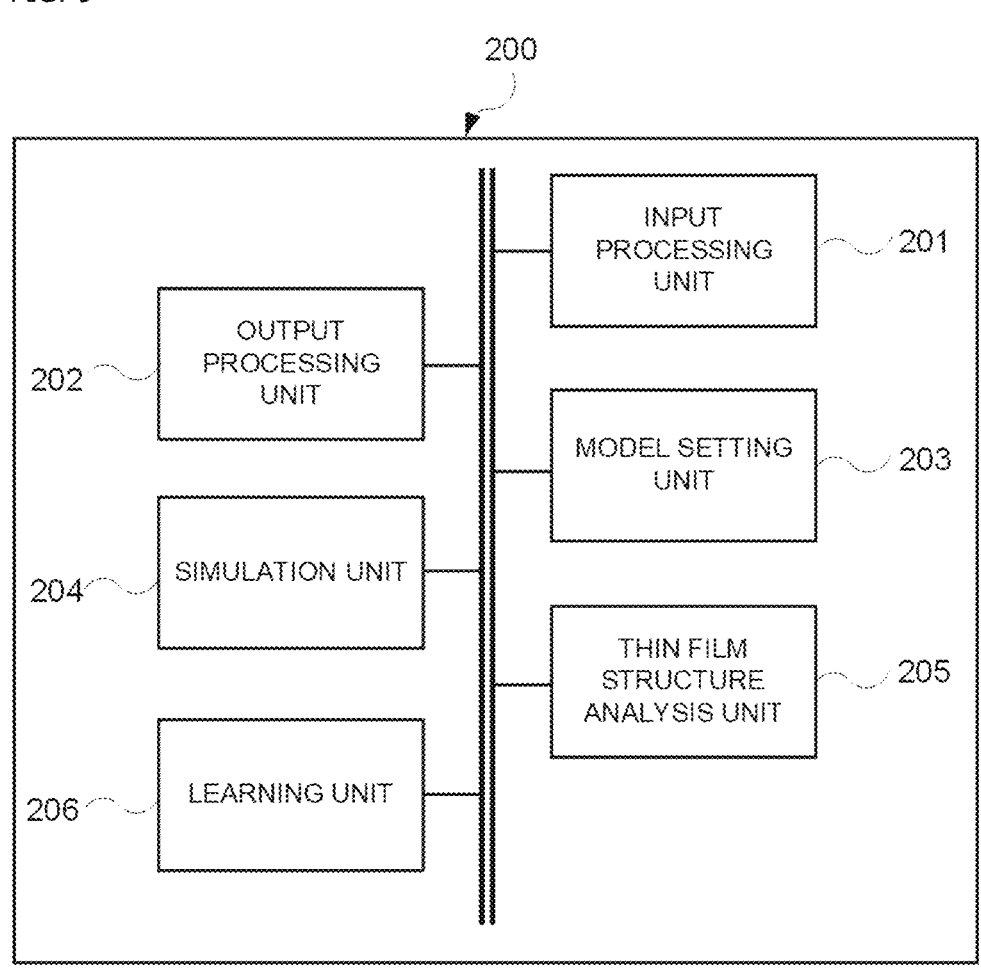
FIG. 9 shows an example of a functional configuration of a server computer.

FIG. 9 shows an example of the functional configuration of the server computer 200.

As shown in FIG. 9, the server computer 200 comprises an input processing unit 201, an output processing unit 202, a model setting unit 203, a simulation unit 204, a thin film structure analysis unit 205, and a learning unit 206.

The model setting unit 203 obtains a model of the thin film based on setting of parameter for each layer of the thin film.

The learning unit 206 allows the neural network to learn using teacher data.

For details of the input processing unit 201, the output processing unit 202, the simulation unit 204, and the thin film structure analysis unit 205 of the server computer 200, please refer to the input processing unit 101, the output processing unit 102, the simulation unit 103, and the thin film structure analysis unit 104 of the client computer 100, respectively.

4. Information Processing Method

In this section, an example of information processing executed by the client computer 100, the server computer 200, and the X-ray analysis apparatus 400 will be described.

4.1. Overview of Information Processing

Overview of information processing will be described with reference to FIGS. 10 and 11.

Figure 10:
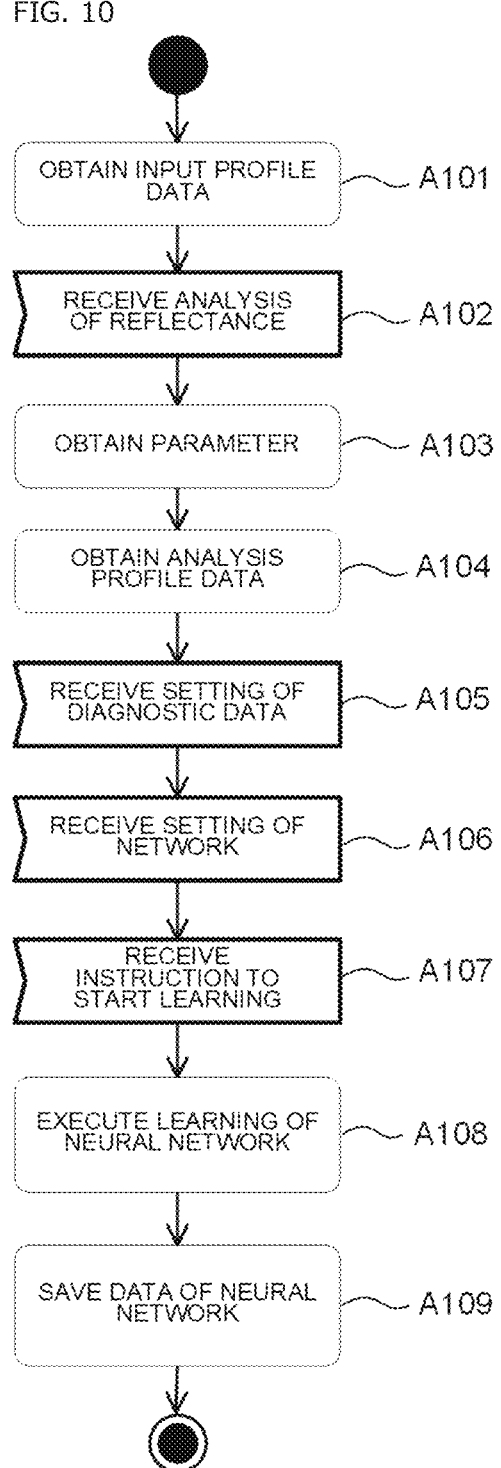
FIG. 10 is an activity diagram showing an example of information processing up to learning.

FIG. 10 is an activity diagram showing an example of information processing up to learning.

In A101, the input processing unit 201 of the server computer 200 obtains input profile data via the input unit 240. At this time, the input processing unit 201 obtains a plurality of identical input profile data in advance for obtaining correct solution profile data and one or more false solution profile data. As a specific means of obtaining the input profile data, for instance, the model setting unit 203 obtains a model of the thin film based on the substance for each layer of the thin film and setting of parameter. The simulation unit 204 may then create measurement simulation profile data based on the substance and parameter of the model of the thin film. For example, the input processing unit 201 may also obtain measurement profile data from the X-ray analysis apparatus 400. Further, the input processing unit 201 duplicates these measurement simulation profile data or measurement profile data to obtain the plurality of identical input profile data.

In A102, the input processing unit 201 receives an instruction of X-ray analysis on the obtained input profile data via the input unit 240. At this time, the input processing unit 201 receives input of analysis setting in such a manner that the correct solution parameter and one or more false solution parameters can be obtained for the plurality of identical input profile data.

In A103, the thin film structure analysis unit 205 analyzes the input profile data to obtain parameter. In other words, the thin film structure analysis unit 205 analyzes the plurality of identical input profile data in such a manner that the correct solution parameter and one or more false solution parameters can be obtained.

In A104, the simulation unit 204 obtains a plurality of analysis profile data by simulating profile for each of the correct solution parameter and one or more false solution parameters. In other words, the plurality of analysis profile data includes correct solution profile data, which is an optimal analysis profile data, and false solution profile data, which is not the correct solution profile data.

In A105, if the input processing unit 201 determines that the analysis profile has been obtained, the input processing unit 201 receives, as diagnostic data, an input indicating that the correct solution profile data is correct, and an input of a reason for diagnosing the false solution profile data as false solution via the input unit 240, respectively. The input processing unit 201 waits until input of these data is received.

In A106, if the input processing unit 201 determines that input of diagnostic data has been received, the process proceed to setting of the neural network. Specifically, the input processing unit 201 receives setting of the neural network such as the number of neurons in each layer, the number of layers included in an intermediate layer, the type of layer, or activation function.

In A107, the input processing unit 201 receives an instruction to start learning via the input unit 240.

In A108, the learning unit 206 allows the neural network to learn using the teacher data. That is, the learning unit 206 generates a neural network that is allowed to machine-learn teacher data using input profile data in relation to an intensity of X-ray from a thin film and analysis profile data obtained from the input profile data as input data, and using diagnostic data obtained by diagnosing the analysis profile data as output data. The learning unit 206 obtains parameter regarding optimized weight and bias from the learned neural network. In the present embodiment, to distinguish from parameter in relation to the thin film such as film thickness, the parameter in relation to the neural network are referred to as NN (Neural Network) parameter. In the present embodiment, although the NN parameter is described as including information in relation to weight and bias, it may be applied as including information such as the number of neurons in each layer, the number of layers included in an intermediate layer, the type of layer, the activation function, etc., in addition to weights and biases. The NN parameter may be treated as including the number of neurons in each layer, the number of layers included in an intermediate layer, the type of layer, activation function, etc. in addition to the weight and bias.

In A109, the output processing unit 202 stores data regarding the neural network in the storage unit 220, such as setting of the neural network and optimized NN parameter. Thereafter, the output processing unit 202 displays on the output unit 250 that the data of the neural network has been saved and that the learning has ended.

Thereby, it is possible to set a neural network that has learned mind of a skilled person.

Figure 11:
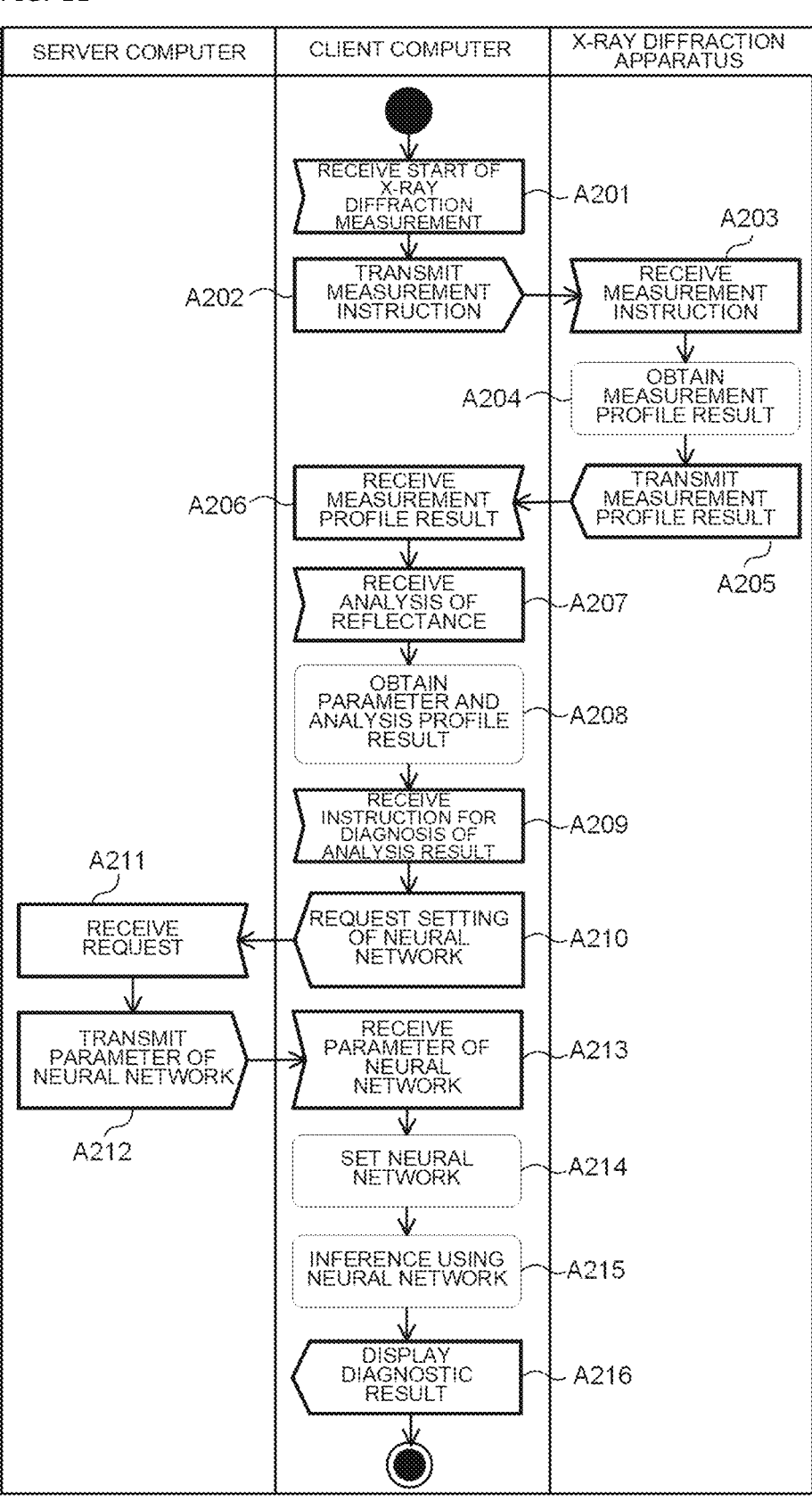
FIG. 11 is an activity diagram showing an example of information processing up to diagnosis.

FIG. 11 is an activity diagram showing an example of information processing up to diagnosis.

In A201, the input processing unit 101 receives an instruction to start an X-ray analysis measurement using the X-ray analysis apparatus 400 via the input unit 140.

In A202, the output processing unit 102 transmits an instruction to start measurement to the X-ray analysis apparatus 400 via the communication unit 130 and the contact unit 500.

In A203, the X-ray analysis apparatus 400 receives an instruction to start measurement from the client computer 100 via the contact unit 500.

In A204, the X-ray analysis apparatus 400 allows X-rays to incident to the thin film and obtains a measurement profile result from the X-rays reflected, diffracted or scattered from the thin film.

In A205, the X-ray analysis apparatus 400 transmits the acquired measurement profile result to the client computer 100 via the contact unit 500.

In A206, the input processing unit 101 receives the measurement profile result from the X-ray analysis apparatus 400 via the communication unit 130 and the contact unit 500.

In A207, the input processing unit 101 receives analysis of the measurement profile result via the input unit 140.

In A208, the thin film structure analysis unit 104 analyzes the measurement profile result and predicts parameter. After that, the simulation unit 103 simulates the profile based on the predicted parameter and obtains the analysis profile result.

In A209, the input processing unit 101 receives an instruction to start diagnosis of the obtained analysis profile result via the input unit 140.

In A210, when receiving an instruction to start diagnosis, the output processing unit 102 transmits a request of the data of the neural network to the server computer 200 via the communication unit 130 and the network 300.

In A211, the input processing unit 201 of the server computer 200 receives the request via the network 300 and the communication unit 230.

In A212, the output processing unit 202 transmits the data of the neural network via the communication unit 230 and the network 300.

In A213, the input processing unit 101 of the client computer 100 receives the data of the neural network via the communication unit 130 and the network 300.

In A214, the output processing unit 102 sets the learned neural network based on the data of the neural network.

In A215, the inference unit 105 obtains a diagnosis result of the analysis profile result by inputting the measurement profile result and the analysis profile result obtained from the measurement profile result to the learned neural network. That is, the inference unit 105 diagnoses whether the analysis profile result is a false solution based on the learned neural network.

In A216, the output processing unit 102 displays the diagnostic result on the output unit 150. At this time, if the analysis profile result is a correct solution, the output processing unit 102 displays on the output unit 150 that it is correct. Further, if the analysis profile result is a false solution, the output processing unit 102 displays the reason for diagnosing it as a false solution on the output unit 150.

As a result, it is possible to verify the validity of its own analysis result using a neural network that has learned the mind of a skilled person.

Figure 12:
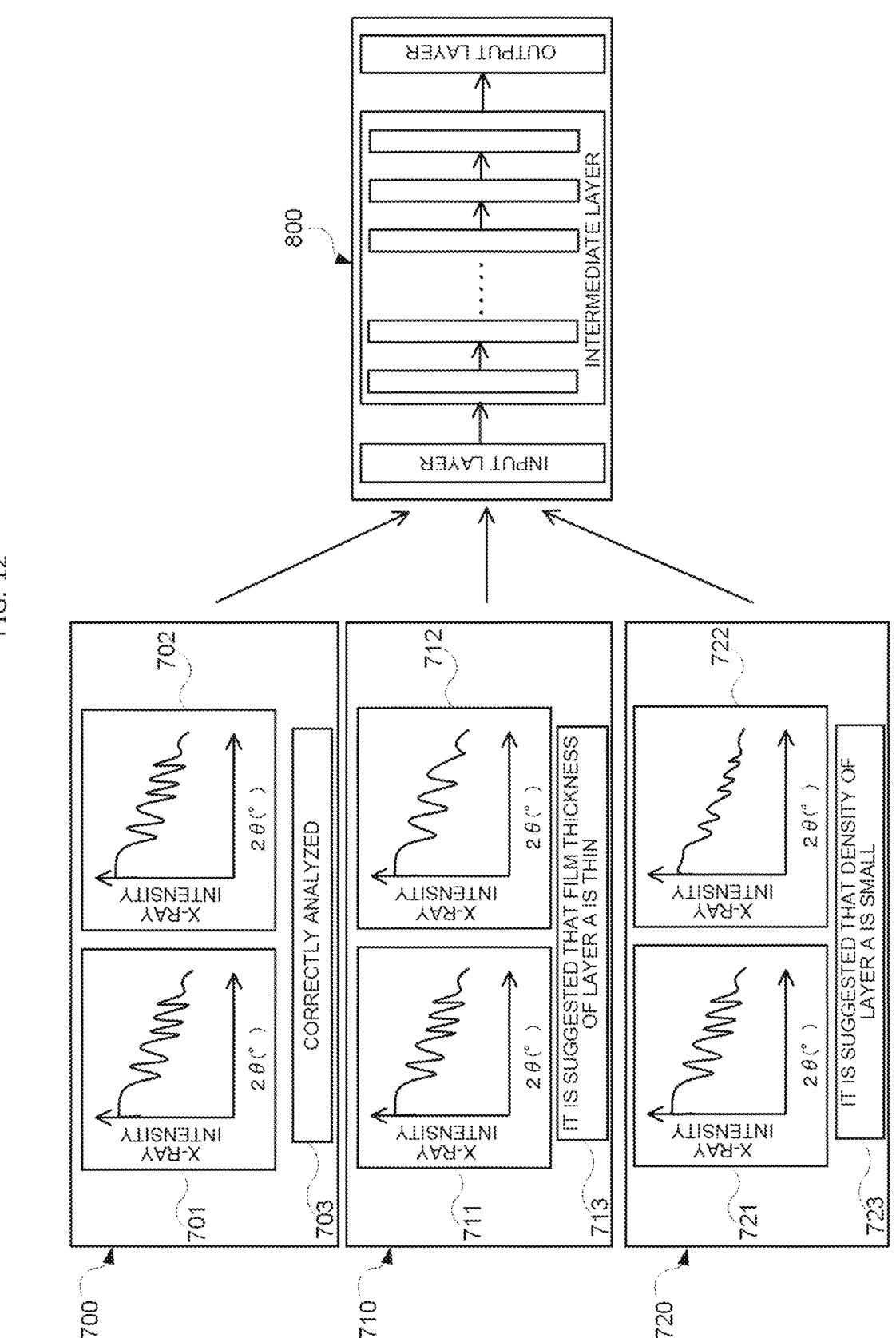
FIG. 12 shows an example of information processing during learning using a neural network.

FIG. 12 shows an example of information processing during learning using a neural network.

In FIG. 12, teacher data 700, teacher data 710, teacher data 720 and a neural network 800 are included. The teacher data 700, the teacher data 710, and the teacher data 720 include same input profile data 701, input profile data 711, input profile data 721. One input profile data 701 is associated with correct solution profile data 702. Diagnostic data 703 corresponding to the correct solution profile data 702 includes a comment diagnosed as correct solution, such as "correctly analyzed". In addition, false solution profile data 711 and false solution profile data 722 are associated with other input profile data 711 and input profile data 721. Diagnostic data 712 and diagnostic data 723 corresponding to the false solution profile data 712 and the false solution profile data 722 include comments regarding a reason for the diagnosis of false solution such as "it is suggested that the film thickness of layer A is thin", "it is suggested that the density of layer A is low", or the like. Here, the reason for diagnosing false solution is a reason in relation to structure, film thickness, roughness, density, state, constituent element, lattice constant, and size distribution of the thin film. Reason for structure includes reason such as incorrect structure, too many or not enough layers, etc. Reason for film thickness includes reason such as thick or thin film thickness. Furthermore, reason for roughness includes reason such as large or small roughness. Reason for density includes reason such as large or small density. Moreover, reason for condition includes reason such as a sample is too coarse, the sample is too thick, the sample is bent, the sample is out of order, etc. Reason for constituent element includes reason such as elements are not matching. Reason for lattice constant includes reason such as large or small lattice constant. Furthermore, reason for size distribution includes reason such as shape of distribution is different. Reason for diagnosing a false solution may also include reason in relation to measurement failure. Reason diagnosed as a false solution may comprise any combination of these reasons. The neural network 800 includes an input layer, an intermediate layer, and an output layer.

The learning unit 206 of the server computer 200 allows the neural network 800 to machine-learn teacher data using the input profile data 701, the input profile data 711, and the input profile data 721 in relation to an intensity of X-ray from the thin film and the correct solution profile data 702 and the false solution profile data 712 and the false solution profile data 722, which are obtained from the input profile data 701, the input profile data 711, and the input profile data 721, as input data, and using the diagnostic data 703, the diagnostic data 713, and the diagnostic data 723, which are correspond to the correct solution profile data 702, the false solution profile data 712, and the false solution profile data 722, as output data.

Thereby, it is possible to set a neural network that is allowed to learn mind of a skilled person.

Figure 13:
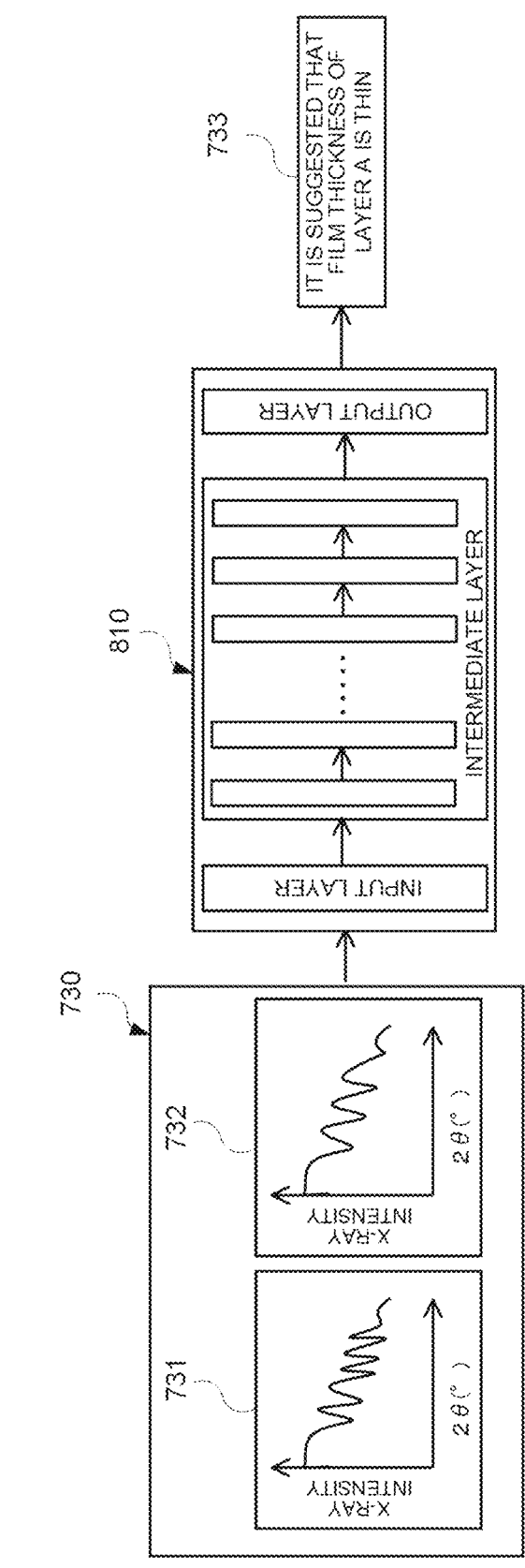
FIG. 13 shows an example of information processing during diagnosis using a learned neural network.

FIG. 13 shows an example of information processing during diagnosis using a learned neural network 810.

In FIG. 13, input data 730 and the learned neural network 810 are included. The learned neural network 810 is a neural network that is allowed to machine-learn teacher data using the input profile data 701, the input profile data 711, and the input profile data 721 in relation to an intensity of X-ray from the thin film and the correct solution profile data 702 and the false solution profile data 712 and the false solution profile data 722, which are obtained from the input profile data 701, the input profile data 711, and the input profile data 721, as input data, and using the diagnostic data 703, the diagnostic data 713, and the diagnostic data 723, which are obtained by diagnosing the correct solution profile data 702, the false solution profile data 712, and the false solution profile data 722, as output data.

The inference unit 105 of the client computer 100 inputs a comment 733 such as "it is suggested that the film thickness of layer A is thin" by inputting an input profile result 731 in relation to an intensity of X-ray from the thin film and an analysis profile result 732 of the input profile result 731 to the learned neural network 810. The comment 733 is an example of a diagnostic result.

As a result, it is possible to verify the validity of its own analysis result using a neural network that has learned mind of a skilled person.

According to the first embodiment described above, as for whether an obtained analysis profile is accurate or not, even a person who is unskilled in X-ray analysis can confirm whether obtained data is accurate or not. In addition, it is possible to confirm whether the obtained data is accurate or not while reducing the processing load of the controller of the client computer. Furthermore, the use of a cache memory of the controller of the client computer can be reduced. In addition, compared to various verification methods, the verification can be executed at a lower cost because it does not require large-scale apparatus or computer.

Second Embodiment

Next, a in which the server computer executes diagnosis of the analysis profile result will be described.
1. System Configuration
   An information processing system in a second embodiment has the same configuration as that of the first embodiment.
2. Hardware Configuration
   Hardware configurations of a client computer, a server computer, and an X-ray analysis apparatus in the second embodiment are the same as those of the first embodiment.
3. Functional Configuration
   The client computer of the second embodiment does not have an inference unit compared to the first embodiment. On the other hand, the server computer in the second embodiment has an inference unit compared to the first embodiment.
4. Information Processing Method
   In the second embodiment, diagnosis of an analysis profile result is executed by the server computer.
   In other words, in the second embodiment, the processing from A209 to A215 in the first embodiment are replaced with different processing as compared with the first embodiment.
   Specifically, in A208 of the first embodiment, after the client computer obtains the analysis profile result, an input processing unit of the client computer waits until the server computer receives an instruction to diagnose the analysis result.
   When an output processing unit of the client computer determines that the server computer has received an instruction to diagnose the analysis results, the output processing unit transmits the measurement profile result, the analysis profile result, and the instruction to diagnose the analysis result to the server computer via a communication unit and a network.
   The input processing unit of the server computer receives the measurement profile result, the analysis profile result, and the instruction to diagnose the analysis result via the network and the communication unit.

When the output processing unit of the server computer determines that it has received the instruction to diagnose the analysis result, the output processing unit obtains an NN parameter and setting of a neural network from a storage unit and sets a learned neural network.

The inference unit of the server computer obtains a diagnosis result of the analysis profile result by inputting the measurement profile result and the analysis profile result obtained from the measurement profile result to the learned neural network.

The output processing unit of the server computer transmits the diagnosis result to the client computer via the communication unit and the network.

The input processing unit of the client computer receives the diagnosis result.

Finally, when the output processing unit of the client computer determines that the diagnosis result has been received, it displays the diagnosis result on the output unit.

As described above, according to the second embodiment, a machine-learning service can be provided by an external server.

Third Embodiment

Next, a case in which diagnosis of an analysis profile result is executed by one computer will be described.
1. System Configuration Compared to the first embodiment, an information processing system of a third embodiment does not comprise a server computer and a network. In the third embodiment, a configuration corresponding to the client computer 100 of the first embodiment is referred to as a computer.
2. Hardware Configuration Hardware configurations of a computer and an X-ray analysis apparatus in the third embodiment are the same as those of the client computer 100 and the X-ray analysis apparatus 400 in the first embodiment.
3. Functional Configuration The computer in the third embodiment comprises an input processing unit, an output processing unit, a model setting unit, a simulation unit, a thin film structure analysis unit, a learning unit, and an inference unit. For details of each functional configuration, please refer to the first embodiment.
4. Information Processing Method In the third embodiment, as compared with the first embodiment, information is not transmitted and received between computers, and all processing is executed by one computer.

That is, in the third embodiment, information transmission/reception processing from A210 to A213 is not executed. Further, processing from A101 to A109, processing of A201 an A202, processing from A206 to A209, and processing from A214 to A216 are executed on the same computer.

As described above, according to the third embodiment, it is possible to confirm whether obtained data is correct or not without connecting to the network.
[Other]

Although supervised learning using teacher data has been described in the first embodiment to the third embodiment, reinforcement learning may be performed as a variation. Specifically, the learning unit may further optimize the neural network based on newly obtained measurement profile result, analysis profile result, and diagnosis result.

Moreover, in the first embodiment to the third embodiment, various neural networks such as CNN (Convolutional Neural Network) or RNN (Recurrent Neural Network) may be arbitrarily applied.

The present invention may be provided in each of the following aspects.

The information processing apparatus, wherein: the analysis profile data includes correct solution analysis profile data, which is optimal analysis profile data, or false solution profile data, which is not the correct solution analysis profile data.

The information processing apparatus, wherein: the diagnostic data corresponding to the false solution profile data includes a reason for diagnosing a false solution.

The information processing apparatus, wherein: the reason for diagnosing the false solution is a reason in relation to one or more of the following: structure, film thickness, roughness, density, state, constituent element, lattice constant, or size distribution of the thin film.

The information processing apparatus, wherein: a plurality of the input data includes the same input profile data, the correct solution profile data is associated with one of the input profile data, and the false solution profile data is associated with the other input profile data.

The information processing apparatus, further comprising: a display unit, wherein the processor is configured to execute the program so as to allow the display unit to display a reason for diagnosing a false solution when the analysis profile result is diagnosed as a false solution based on the neural network.

An information processing apparatus, comprising: a processor configured to execute a program so as to generate a neural network that is allowed to machine-learn teacher data using input profile data in relation to an intensity of X-ray from a thin film and analysis profile data obtained from the input profile data as input data, and using diagnostic data obtained by diagnosing the analysis profile data as output data; and a storage unit storing the neural network.

The information processing apparatus, wherein: the analysis profile data includes correct solution analysis profile data, which is optimal analysis profile data, and false solution profile data, which is not the correct solution analysis profile data, and the processor configured to execute the program so as to receive input of a reason for diagnosing a false solution as the diagnostic data for the false solution profile data.

An information processing method executed by an information processing apparatus, comprising: outputting a diagnostic result diagnosing an analysis profile result by inputting an input profile result in relation to an intensity of X-ray from a thin film and the analysis profile result of the input profile result to a neural network, wherein the neural network is a neural network that is allowed to machine-learn teacher data using input profile data in relation to an intensity of X-ray from a thin film and analysis profile data obtained from the input profile data as input data, and using diagnostic data obtained by diagnosing the analysis profile data as output data.

A non-transitory computer readable media storing a program, wherein: the program allows a computer to function as the information processing apparatus.

An X-ray analysis apparatus, configured to: allow X-ray to incident to a thin film, obtain a measurement profile result from X-ray reflected, diffracted or scattered from the thin film, and transmit the measurement profile result to the information processing apparatus.

Of course, the above aspects are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. An information processing apparatus, comprising:
a processor configured to execute a program so as to output a diagnostic result diagnosing an analysis profile result by inputting an input profile result in relation to an intensity of X-ray from a thin film and the analysis profile result of the input profile result to a neural network, wherein
the neural network is a neural network that is allowed to machine-learn teacher data using
input profile data in relation to an intensity of X-ray from a thin film,
analysis profile data obtained from the input profile data as input data, the analysis profile data including correct solution analysis profile data representing accurate physical properties of the thin film, and one or more false solution profile data, each representing inaccurate physical properties of the thin film, and
diagnostic data corresponding to the analysis profile data,
wherein the diagnostic data corresponding to each of the false solution profile data includes a reason for diagnosing the false solution profile data as false, wherein the reason includes a textual explanation identifying a specific discrepancy between the input profile data and the corresponding false solution analysis profile data attributable to at least one physical property of the thin film,
wherein the diagnostic data corresponding to the correct solution analysis profile data indicates correctness of the correct solution analysis profile data,
wherein the at least one physical property includes structure, film thickness, roughness, density, state, constituent element, lattice constant, or size distribution of the thin film.

2. The information processing apparatus according to claim 1, wherein:
a plurality of the input data includes the same input profile data,
the correct solution profile data is associated with one of the input profile data, and
the false solution profile data is associated with the other input profile data.

3. The information processing apparatus according to claim 1, further comprising:
a display, wherein
the processor is configured to execute the program so as to allow the display to display the reason for diagnosing a false solution when the analysis profile result is diagnosed as a false solution based on the neural network.

4. An information processing apparatus, comprising:
a processor configured to execute a program so as to generate a neural network that is allowed to machine-learn teacher data using input profile data in relation to an intensity of X-ray from a thin film,
analysis profile data obtained from the input profile data as input data, the analysis profile data including correct solution analysis profile data representing accurate physical properties of the thin film, and one or more false solution profile data, each representing inaccurate physical properties of the thin film, and
diagnostic data corresponding to the analysis profile data,
wherein the diagnostic data corresponding to each of the false solution profile data includes a reason for diagnosing the false solution profile data as false, wherein the reason includes a textual explanation identifying a specific discrepancy between the input profile data and the corresponding false solution analysis profile data attributable to at least one physical property of the thin film,
wherein the diagnostic data corresponding to the correct solution analysis profile data indicates correctness of the correct solution analysis profile data,
wherein the at least one physical property includes structure, film thickness, roughness, density, state, constituent element, lattice constant, or size distribution of the thin film; and
a memory storing the neural network.

5. The information processing apparatus according to claim 4, wherein
the processor is configured to execute the program so as to receive input of a reason for diagnosing a false solution as the diagnostic data for the false solution profile data.

6. An information processing method executed by an information processing apparatus, comprising:
outputting a diagnostic result diagnosing an analysis profile result by inputting an input profile result in relation to an intensity of X-ray from a thin film and the analysis profile result of the input profile result to a neural network, wherein
the neural network is a neural network that is allowed to machine-learn teacher data using
input profile data in relation to an intensity of X-ray from a thin film,
analysis profile data obtained from the input profile data as input data, the analysis profile data including correct solution analysis profile data representing accurate physical properties of the thin film, and one or more false solution profile data, each representing inaccurate physical properties of the thin film, and
diagnostic data corresponding to the analysis profile data,
wherein the diagnostic data corresponding to each of the false solution profile data includes a reason for diagnosing the false solution profile data as false, wherein the reason includes a textual explanation identifying a specific discrepancy between the input profile data and the corresponding false solution analysis profile data attributable to at least one physical property of the thin film,
wherein the diagnostic data corresponding to the correct solution analysis profile data indicates correctness of the correct solution analysis profile data, wherein the at least one physical property includes structure, film thickness, roughness, density, state, constituent element, lattice constant, or size distribution of the thin film.

7. A non-transitory computer readable media storing a program, wherein:

the program allows a computer to function as the information processing apparatus according to claim 1.

8. An X-ray analysis apparatus, configured to:

allow X-ray to incident to a thin film, obtain a measurement profile result from X-ray reflected, diffracted or scattered from the thin film, and transmit the measurement profile result to the information processing apparatus according to claim 1.

\* \* \* \* \*